(12) United States Patent
Panattu Sethumadhavan et al.

(10) Patent No.: US 9,059,968 B2
(45) Date of Patent: Jun. 16, 2015

(54) STATELESS TRANSMISSION CONTROL PROTOCOL RENDEZVOUS SOLUTION FOR BORDER GATEWAY FUNCTION

(75) Inventors: Santosh Panattu Sethumadhavan, San Jose, CA (US); Brian Kean, Cincinnati, OH (US); Yakob Teplitsky, Cupertino, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 684 days.

(21) Appl. No.: 12/614,372

(22) Filed: Nov. 6, 2009

(65) Prior Publication Data

US 2011/0113145 A1    May 12, 2011

(51) Int. Cl.
*G06F 15/16* (2006.01)
*H04L 29/06* (2006.01)

(52) U.S. Cl.
CPC .......... *H04L 63/0281* (2013.01); *H04L 63/029* (2013.01); *H04L 63/166* (2013.01); *H04L 69/161* (2013.01); *H04L 69/163* (2013.01)

(58) Field of Classification Search
CPC . H04L 63/0281; H04L 63/029; H04L 63/166; H04L 69/161; H04L 69/163
USPC ................................. 709/227, 228
See application file for complete search history.

(56) References Cited

U.S. PATENT DOCUMENTS

| | | | |
|---|---|---|---|
| 7,194,535 B2* | 3/2007 | Hannel et al. ................. 709/224 |
| 2003/0105812 A1* | 6/2003 | Flowers et al. ............... 709/203 |
| 2006/0190612 A1* | 8/2006 | Kahol et al. .................. 709/230 |
| 2009/0106830 A1* | 4/2009 | Maher ............................. 726/12 |
| 2009/0177787 A1 | 7/2009 | Ishikawa et al. | |

OTHER PUBLICATIONS

Rosenberg. J. et al., "Reliability of Provisional Responses in the Session Initiation Protocol (SIP)", Jun. 2002, 14 pages, Network Working Group, Request for Comments 3262, The Internet Society.
"Transmission Control Protocol, Darpa Internet Program, Protocol Specification", Sep. 1981, 89 pages, RFC 793, Information Sciences Institute, University of Southern California, Marina del Ray, California.
Rosenberg, J. et al., "Traversal Using Relays around NAT (TURN): Relay Extensions to Session Traversal Utilities for NAT (STUN) draft-ieft-behave-turn-16", Jul. 3, 1999, 79 pages, BEHAVE WG, Internet Draft, The Internet Society.
Postel, J., "User Datagram Protocol", Aug. 28, 1980, 3 pages, RFC 768.

* cited by examiner

*Primary Examiner* — Joseph Greene
(74) *Attorney, Agent, or Firm* — Nicholson De Vos Webster & Elliott LLP

(57) ABSTRACT

A method and apparatus for brokering a transmission control protocol (TCP) session between two clients that are each situated behind a firewall that blocks incoming TCP session requests is described. Each of the two clients transmits a TCP session request to the other client in order to establish a TCP session between these clients. This brokering allows the two clients to establish the TCP session between the two clients.

21 Claims, 9 Drawing Sheets

STATELESS TRANSMISSION CONTROL PROTOCOL RENDEZVOUS SOLUTION FOR BORDER GATEWAY FUNCTION

BACKGROUND

1. Field

Embodiments of the invention relate to the field of processing network traffic; and more specifically, to the brokering a transmission control protocol session between two clients.

2. Background

Clients, such as computers, laptops, etc., can transmit and/or receive data using transmission control protocol (TCP) to provide a reliable, ordered delivery of that data. For example, a client uses TCP to transport Web, e-mail, file transfer, voice over internet protocol (VOIP) data, or other types of data. To transport data to another client using TCP, a client first needs to establish a TCP session with the other client. Pairs of clients establish a TCP session using a 3-way handshake. In this handshake, one client initiates the TCP session using a TCP session request (e.g., a TCP SYN packet). The other client receives the TCP session request and acknowledges the TCP session request by transmitting a response to the TCP session request back to the initiating client (e.g., a TCP SYN ACK packet). Upon receiving the response, the initiating client sends an acknowledgement to the other client (e.g., a TCP ACK packet).

Modern firewalls, however, will typically drop a TCP session request that is incoming to a client and thus preventing the establishment of a TCP session with a client that is behind a firewall. For example, this can prevent the establishment of a TCP session between two clients that are each behind a firewall for a voice over internet protocol (VOIP) call or other multimedia communication (e.g., chat, file sharing, etc.). In addition, a firewall may perform network address translation as known in the art. Currently, there are two known ways to overcome this problem: (i) create a permanent hole in the firewall so that incoming TCP session requests can reach a client behind that firewall or disable TCP state checking in the firewall and (ii) have a network element terminate a TCP session with each client and forward TCP traffic between each of the sessions. Each of these ways has drawbacks. For example, creating a hole in a firewall is a security risk to that client protected by the firewall. As another example, requiring the network element to forward traffic between the TCP sessions does not scale well because the network element would need to maintain a full TCP stack for each terminated TCP session.

SUMMARY

A method and apparatus of brokering a TCP session between two clients that are each situated behind a firewall is described. Each of the two clients transmits a TCP session request to the other client in order to establish a TCP session between these clients. The firewalls for each of the clients blocks incoming TCP session requests. This brokering allows the two clients to establish the TCP session between the two clients.

In one embodiment, the method operates by receiving a first TCP session from one of the clients. The method further stores information contained in the first TCP session request. A second TCP session request is received from the second of the two clients. In response to receiving the second TCP session request, the method generates a first session response to the second TCP session request using the stored information. The method transmits the generated response to the second client, where the first session response is used by the second client to establish the TCP session between the two clients.

In another embodiment, a network comprises a set of one or more firewall devices, a plurality of clients, and a network element. Each of the plurality of clients transmits TCP session requests to other ones of the clients to establish a TCP session with that client. Furthermore, each of the clients is coupled behind one of the firewalls and these firewalls block incoming TCP session requests to a client.

The network element is coupled to the firewalls and comprises a session brokering component and a firewall component. The session brokering component brokers TCP sessions between pairs of clients that allows establishment of a TCP session between client pair. The session brokering component receives a TCP session request from a first client of a client pair and from a second TCP session request from the second client of that client pair. The TCP session request is a request to establish a TCP session between the first and second clients. The session brokering component stores the information contained in the first TCP session request. In response to the received second TCP session request, the session broker generates a session response to the second TCP session request using the stored information. The session broker further transmits this session response to the second client. The second client uses the session response to establish the TCP session between the first and second clients.

The forwarding component is coupled to the session brokering component and forwards traffic between the client pair using the established TCP session.

In another embodiment, a network element is adapted to broker TCP sessions between different pairs of client. Each client in a client pair transmits TCP session requests to the other client in that client pair in order to establish a TCP session. In addition, each client is coupled behind a firewall that blocks incoming TCP session requests.

The network element comprises a session brokering component and a forwarding component coupled to the session brokering component. The session brokering component is to receive a first TCP session request from a first client of that client pair and a second TCP session request from the second client of that client pair, to store information contained in the first TCP session request, to generate, in response to the received second TCP session request, a first session response to the first TCP session request using the stored information, and to transmit the first session response to the second client. The second client uses the first session response to establish the TCP session between the first and second clients. The forwarding component is to forward traffic between that client pair using the corresponding brokered session.

BRIEF DESCRIPTION OF THE DRAWINGS

The invention may best be understood by referring to the following description and accompanying drawings that are used to illustrate embodiments of the invention.

In the drawings.

DETAILED DESCRIPTION

Figure 1:
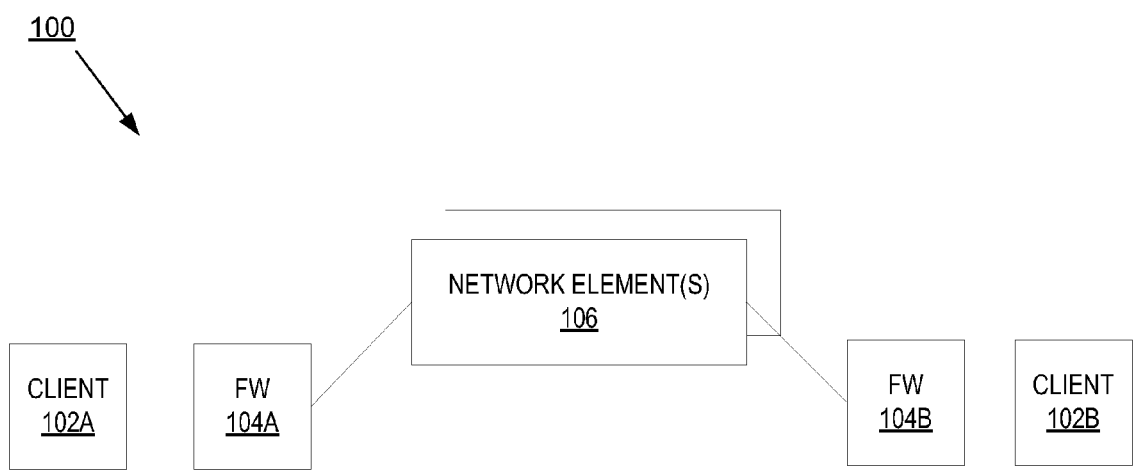
FIG. 1 (prior art) illustrates a network coupling two clients through two firewalls.

The following description describes methods and apparatus for brokering a transmission control protocol (TCP) session between two clients that are each situated behind a firewall. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, router with a border gateway function, media gateway, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, palm tops, mobile phones, smartphones, multimedia phones, Voice Over Internet Protocol (VOIP) phones, portable media players, GPS units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public webpages (free content, store fronts, search services, etc.), private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

In addition, a network element can have border gateway functionality. A distributed session border controller (SBC) system includes a signaling SBC (S-SBC) and a data SBC (D-SBC). The S-SBC controls the opening, closing, and policing of traffic flows through the D-SBC through a standard interface (e.g., the Ia interface defined by ETSI (European Telecommunications Standards Institute) TISPAN (Telecommunications and Internet converged Services and Protocols for Advanced Networking) which uses the H.248 control protocol ("Gateway control protocol: Version 3", ITU-T Recommendation H.248.1, September 2005). H.248 messages are transmitted between the S-SBC and the D-SBC. In 3GPP (3rd Generation Partnership project) IMS (IP multimedia subsystem) architecture, D-SBC is also referred to as BGF (Border gateway function).

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms.

A method and apparatus of brokering a TCP session between two clients that are each situated behind a firewall that blocks incoming TCP session requests is described. A network element can broker the TCP session by acting as a TCP server for each of the clients in response to receiving TCP session requests from the clients. In one embodiment, the method receives a TCP session request from each of the clients and stores information from the TCP session request. Furthermore, the method generates and transmits TCP session responses back to the clients. After the clients receive the TCP session responses, each client acknowledges the TCP session response, in which the method forwards to the appropriate client. This establishes the TCP session between the two clients.

FIG. 1 (prior art) illustrates a network 100 coupling two clients 102A-B through two firewalls 104A-B. In FIG. 1, network 100 comprises two clients 102A-B that are coupled behind respective firewalls 104A-B. In one embodiment, each of the clients 102A-B are a subscriber end stations as described above, such as a computer, laptop, server, etc. In another embodiment, clients 102A-B are subscriber end stations that are capable to making a VOIP telephone call over a TCP session.

Firewalls 104A-B are a type of firewall that will drop incoming TCP session requests to a client that is situated behind that firewall. For example, and in one embodiment, firewalls 104A-B are a stateful packet inspection firewall as known in the art. In addition, network element(s) 106 couple to firewalls 104A-B. Network element(s) represent one or more network elements that are used to forward traffic to and/or from clients 102A-B and firewalls 104A-B. In this embodiment, for clients 102A-B to establish a TCP session between them, the TCP session will be through firewalls 104A-B and network element(s) 106.

Figure 2:
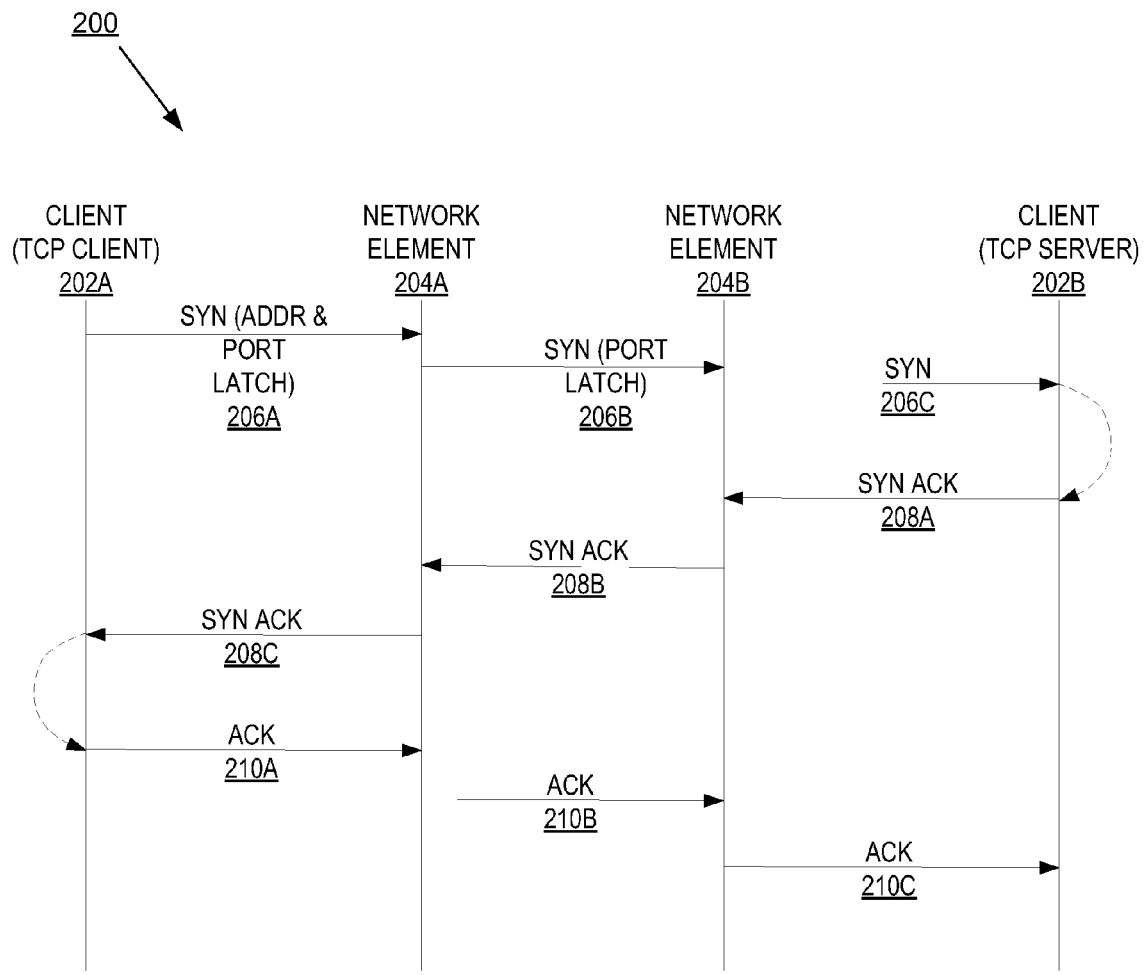
FIG. 2 (prior art) illustrates a state diagram for a 3-way handshake protocol used to establish a transmission control protocol (TCP) session between a TCP client and a TCP server FIG. 3 (prior art) illustrates a state diagram of a system where a network element terminates two TCP sessions with two different clients.

As described above, in order to establish a TCP session, a 3-way handshake protocol is used between the client initiating the TCP session and the other device in the TCP session. FIG. 2 (prior art) illustrates a state diagram 200 for the 3-way handshake protocol used to establish a transmission control protocol (TCP) session between two clients 202A-B. This state diagram assumes that each TCP packet in the 3-way handshake protocol progresses unimpeded through the network and is not dropped by an intervening firewall. In FIG. 2, client 202A is a TCP client that initiates the TCP session request and client 202B is a TCP server that waits for a TCP session request. Client 202A transmits a SYN packet 206A towards client 202B. As is known in the art, a SYN packet is used to request a TCP session and includes the destination address of the TCP server, a sequence number, window parameters, an offset, options, etc.

Network element 204A receives the SYN packet. Network element 204A performs port and address latching on the received SYN packet. Address and port latching is the translation of the destination address and port to different address and port. For example, the destination address and port for the SYN packet is the address of network element 204A and a port on that network element. Network element 204A translates this destination address/port to a destination address/port for network element 204B. In one embodiment, address and port latching is used to funnel traffic through the network element performing the latching. The destination address/port combination is also called a destination descriptor. A router with the border gateway functionality or a media gateway will perform the address and port latching. Network element 204A forwards this translated SYN packet 206B onto network element 204B. Network element 204B in turn forwards, using address and port latching, the SYN packet to client 202B (206C).

Client 202B receives the SYN packet and in turn transmits a SYN ACK packet towards client 202A (208A). As in known in the art, a SYN ACK packet is an acknowledgement form the TCP server to the TCP client. Client 202B sets the acknowledgement number in the SYN ACK packet to the received sequence number and sets the sequence number in this packet to a random number. Network elements 204A-B (208B and 208C) forward the SYN ACK packet to client 202A.

Client 202A receives the SYN ACK packet and transmits an ACK packet back to client 202B (210A). The sequence number of the ACK packet is set to the received acknowledgement value and the sequence number is set to one more than the sequence number of the received SYN ACK packet. Network elements 204A-B (210B and 210C) forward the ACK packet to client 202B. At this point, both clients 202A-B have received an acknowledgement of the TCP session and the TCP session is established.

Figure 3:
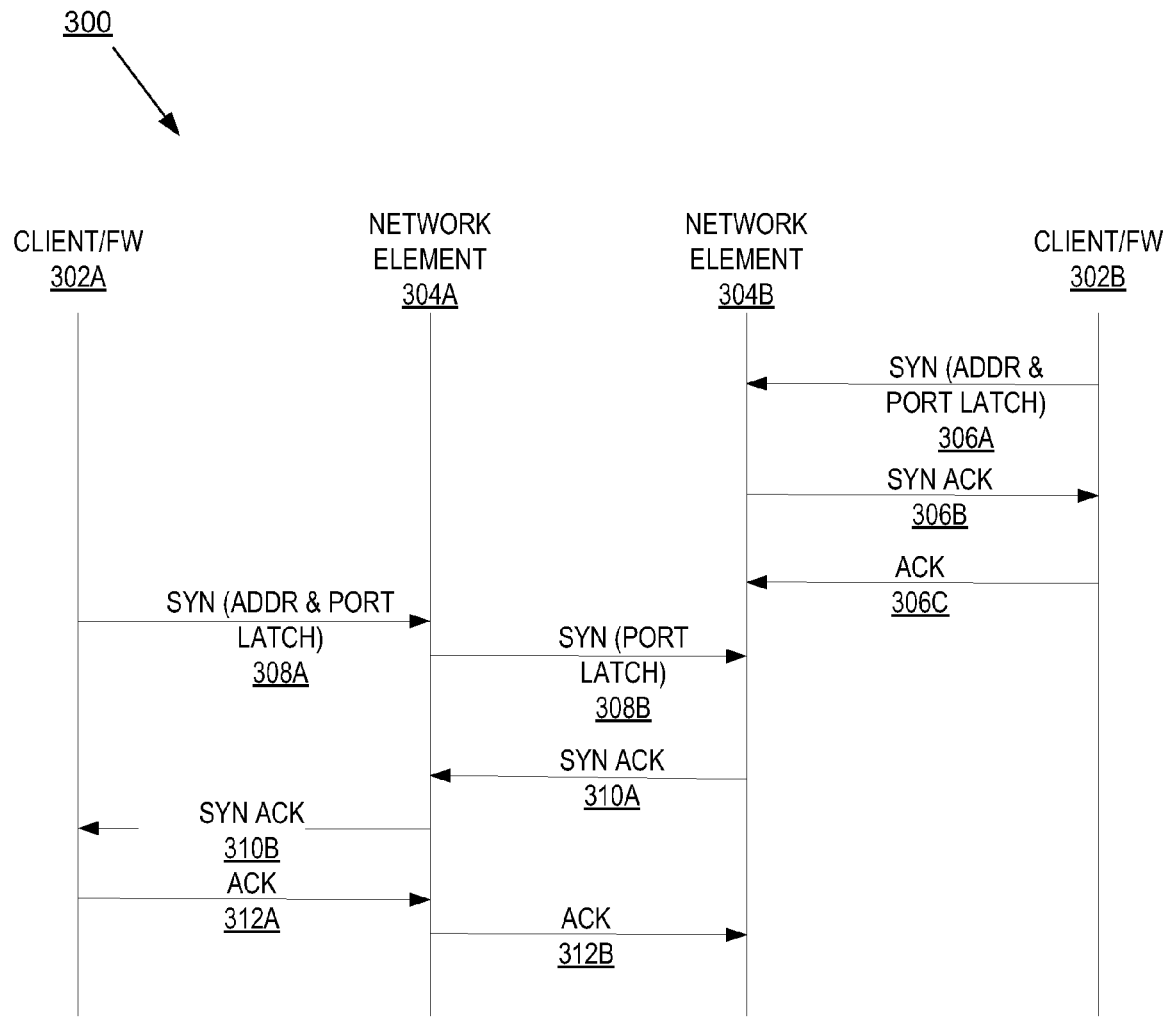

As described above, this 3-way handshake used to establish a TCP session relies on unimpeded network paths. The problem illustrated above is that a firewall will drop an incoming initial TCP session request (e.g., the SYN packet) and, thus, the TCP session will not be established. Thus, for a network as illustrated in FIG. 1, with each client behind a firewall, the corresponding firewall will drop an incoming TCP session request. Another way known in the prior to get around this problem is to have one of the intervening network elements terminate the TCP session with each client and forward the TCP traffic between these two TCP sessions. This allows each client to initiate the TCP session request with the network element acting as a TCP server to each client. By initiating the TCP request from inside the firewall, the firewall will temporarily allow a response to the TCP session request to return to the client. FIG. 3 (prior art) illustrates a state diagram of a system where a network element 304B terminates two TCP sessions with two different clients 302A-B through a pair of firewalls. Typically, a specialized network element other than a router with a border gateway function or media gateway terminates pairs of TCP sessions and forwards data between those pairs of TCP sessions. In FIG. 3, client 302B transmits a SYN packet destined for network element 304B through a firewall (306A). Network element 304B performs port latching on the received SYN packet because the source port of the SYN packet is unknown when the SYN packet is received by network element 304B. This allows the network element 304B to determine the client 302B port dynamically. Unlike in FIG. 2, each client 302A-B is a TCP client, so client 302B transmits a SYN packet to network element 304B using the destination descriptor for network element 304B, in which network element 304B is the TCP server for the TCP session request. Network element 304B receives the SYN packet and responds with a SYN ACK packet transmitted to client 302B (306B) via the firewall. Client 302B receives the SYN ACK packet and responds to the network element 302B with an ACK packet (306C). Network element 302B receives the ACK packet (306C). This establishes a TCP session between client 302B and network element 304B.

Similarly, client 302A establishes a TCP session with network element 304A by initially transmitting a SYN packet to network element 304A (308A), which network element 304A forwards to network element 304B (308B) after address and port latching. The SYN packet transmitted is initially destined for network element 304A and this SYN packet has a destination descriptor for network element 304A. Network element 304A performs address and port latching on this destination descriptor so that this SYN packet can reach network element 304B. As discussed above, address and port latching is translating the destination address and port of the SYN packet (308A) to a destination address and port for network element 304B (308B). Network element 304B receives the SYN packet and responds to client 302A with a SYN ACK packet (310A) via network element 304A (310B). Client 302A responds by transmitting an ACK packet to network element 302B (213A) via network element 304A (312B). This establishes a TCP session between client 302A and network element 304B.

In order for client 302A to send TCP data to client 302B (and visa versa), these clients would use the respective TCP sessions with network element 304B. Network element 304B would then modify and forward the TCP data to correct TCP session. To do this, it requires the network element 304B is required to provide two full TCP server session states to terminate the two TCP sessions discussed above. This can make it difficult to scale because for each pair of terminated TCP sessions, the network element has to maintain large TCP buffers and timers in order to keep track of which TCP packets need to be retransmitted. In addition, the network element needs to perform deep packet inspection on each TCP data packet the network element 304B processes. Because the full TCP stack implementation is complex and deep packet inspection is a laborious process, the setting of two TCP sessions as illustrated in FIG. 3 does not scale well as the number of prospective TCP sessions increase. It would be better if the network element could process TCP data packets using well-known layer 4 (e.g., address and port latching) forwarding techniques.

Figure 4:
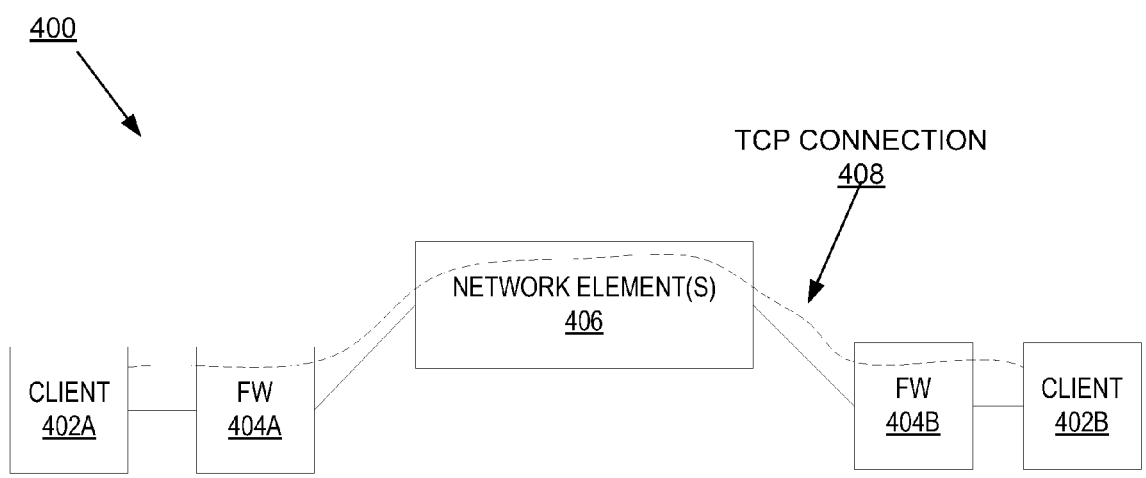
FIG. 4 illustrates a network coupling two clients through two firewalls that enables a TCP session between the two clients according to one embodiment of the invention.

FIG. 4 illustrates a network 400 coupling two clients 402A-B through two firewalls 404A-B that enables a TCP session 408 between the two clients according to one embodiment of the invention. In one embodiment, brokering a TCP session means that the network element acts as the TCP servers for clients 402A-B to facilitate the establishment of a TCP session between clients 402A-B. By brokering the TCP session with a network element 406, the network element allows each client 402A-B to be a TCP client. Because each client 402A-B is a TCP client, firewalls 404A-B will not impede the establishment of the TCP session as each client 402A-B initiates a TCP session request.

As in FIG. 1, each of the clients 402A-B is a subscriber end station as described above, such as a computer, laptop, server, etc. In another embodiment, clients 402A-B are subscriber end stations that are capable to making a VOIP telephone call over a TCP session. Furthermore, firewalls 404A-B are a type of firewall that will drop incoming TCP session requests to a client that is situated behind that firewall. For example, and in one embodiment, firewalls 104A-B are a stateful packet inspection firewall as known in the art. While in one embodiment, firewalls 404A-B are a type of firewall that is common to use in on the premise of a customer's sites, such as an in-home firewall, or a firewall meant for use with a small-medium business. Alternatively, firewall 404A-B can be an enterprise level firewall. While in one embodiment, each client 402A-B couples to a different firewall, in alternative embodiments, clients 402A-B can be coupled to the same firewall. Network element(s) 406 couples firewalls 404A-B. While only two clients are illustrated in FIG. 4, in alternate embodiments, network element(s) 406 can broker TCP sessions for more than one pair of clients, such tens, hundreds, thousands (or greater) of pairs of clients. In addition, network element(s) 406 can broker more than one TCP session for a client.

Figure 5:
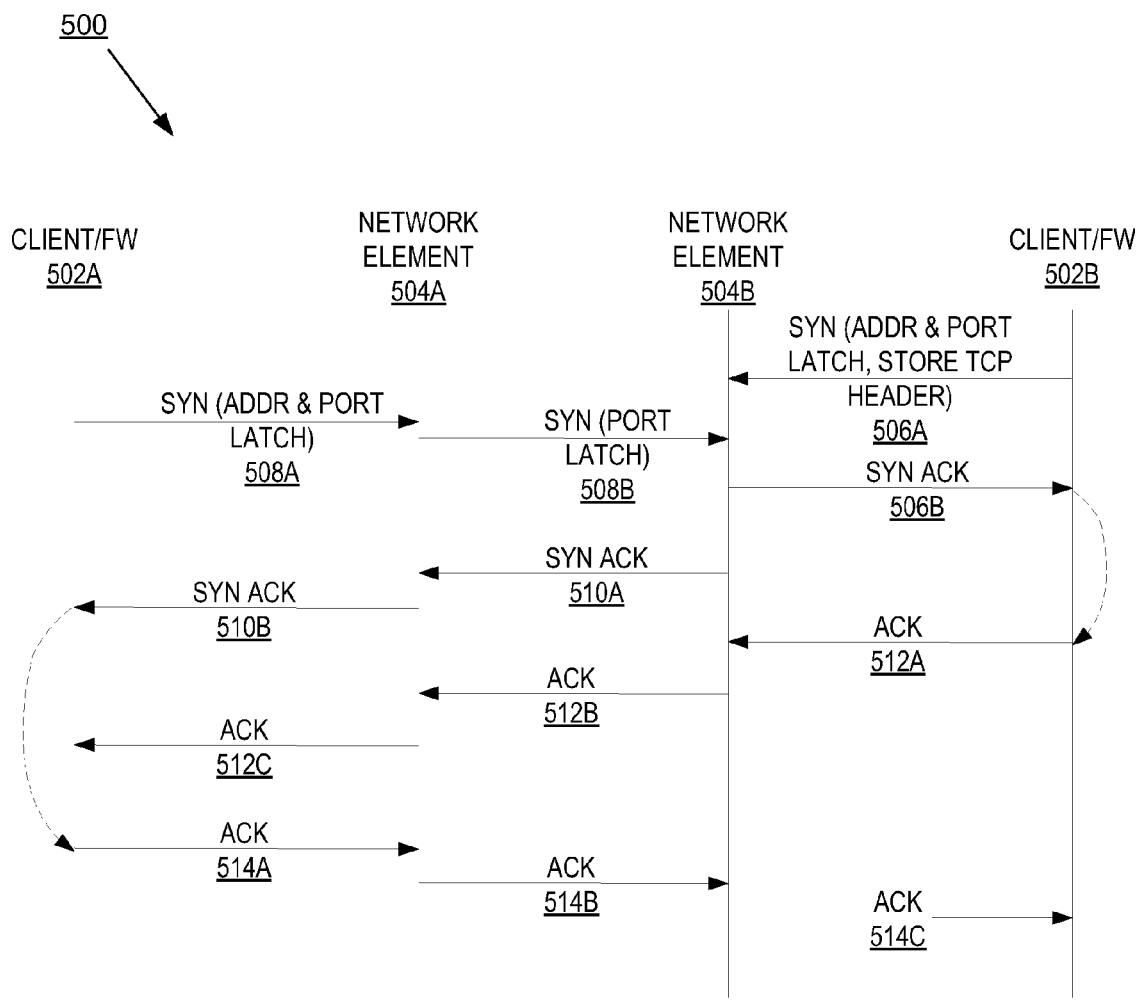
FIG. 5 illustrates a state diagram for a network element to broker, between two clients, the 3-way handshake protocol that is used to establish the TCP session between the two clients according to one embodiment of the invention.

FIG. 5 illustrates a state diagram 500 for a network element to broker, between two clients, the 3-way handshake protocol that is used to establish the TCP session between the two clients according to one embodiment of the invention. In FIG. 5, client 502B is a TCP client that initiates the TCP session request to client 502A. In this embodiment, client 502A transmits a SYN packet (506A, "SYN B") to network element 504B using destination descriptor B ("DDB"). In one embodiment, DDB is a combination of address and port of network element 504. In one embodiment, DDB is assigned to client 502B by a control device to establish the TCP session. For example and in one embodiment, in order to make a VOIP call between clients 502A-B, clients 502A-B are assigned destination descriptors that are used as destinations addresses and ports for the TCP data used by clients 502A-B to establish the TCP session. In this example, the intervening network elements (e.g., network elements 504A-B) translate these destination descriptors into appropriate addresses and ports in order to forward on the TCP data.

Instead of forwarding the SYN packet onto client 502A, network element 504B receives this packet and stores information associated with this packet. For example and in one embodiment, the network element 504B stores the TCP sequence number, the TCP flags, a window parameter, offset, options, etc. While in one embodiment, the network element 504B stores the entire TCP header of the received SYN packet, in alternative embodiments, the network element 504B stores some of the TCP header, and/or other information contained in the SYN packet. In one embodiment, network element 504B does not forward this SYN packet. In addition, network element 504B performs port latching to discover the source port of client 502B.

Client 502A transmits a SYN packet ("SYN A") to network element 504A to establish the TCP session with client 502B (508A). SYN A has as the destination address/port destination descriptor A ("DDA"), which is a destination address/port of network element 504A. Network element 504A performs address and port translation on this packet so that the SYN A packet has the destination address and port of network element 504B, which is the DDB. Network element 504A forwards this translated SYN packet to network element 504B by network element 504A (508B). In addition, network element 504B performs port latching to discover the source port of client 502A.

In response to receiving this second SYN packet, network element 504B generates two different SYN ACK packets that will be transmitted back to the appropriate TCP clients. The two generated SYN ACK packets will be referred to as SYN ACK A, a SYN ACK packet destined for client 502A, and SYN ACK B, a SYN ACK packet destined for client 502B. In one embodiment, network element 504B generates a SYN ACK B from the saved TCP header information. In one embodiment, the generated SYN ACK B has the following information:
  ACK flag set;
  acknowledgement sequence number=sequence number of SYN A+1;
  sequence number=saved TCP header sequence number;
  window=saved TCP header window;
  data offset=saved TCP header data offset;
  options=saved TCP header options; and
  a calculated checksum.
Network element 504B transmits this SYN ACK B packet back to client 502B (506B). By generating the SYN ACK B packet, network element 502B is brokering a TCP session between clients 502A-B by acting as the TCP server for client 502A. In response to receiving the SYN ACK B packet, client 502B generates an ACK packet destined for client 502A to establish the TCP session between clients 502B and 502A. In one embodiment, client 502B transmits an ACK packet to client 502A (512A). While in one embodiment, network elements 504B and 504A forward the ACK packet to client 502A (512B and 512C), in alternate embodiments, one of network elements 504A-B do not forward the ACK packet. At this point in the state diagram, client 502B has established a TCP session to client 502A with the saved TCP parameters that originated from client 502B.

In addition to generating a SYN ACK B packet transmitted to client 502B, network element generates SYN ACK A packet that is to be transmitted eventually to client 502A. This SYN ACK packet is used by client 502A to establish a TCP session between client 502A and client 502B. In one embodiment, the generated SYN ACK A has the following information:
  ACK flag set;
  acknowledgement sequence number=sequence number of SYN B+1;
  sequence number=SYN A sequence number;
  window=SYN A window;
  data offset=SYN A data offset;
  options=SYN A options; and
  a calculated checksum.
Network element 504B transmits this SYN ACK A packet back to client 502A with the same destination descriptor (DDA) used in the SYN A packet. By generating the SYN ACK A packet, network element 504B is brokering a TCP session between clients 502A-B by acting as the TCP server for client 502B. Network element 504B is also merging the requests for two different TCP sessions into a single TCP session between clients 502A-B. By brokering the TCP sessions between clients 502A-B and not terminating these TCP sessions, network element does not need to maintain the full TCP stack. Instead, the clients 502A-B maintain the full end to end TCP session as these clients 502A-B would normally do in a TCP session.

Network element 504A receives the SYN ACK A packet and translates DDA to a destination descriptor for client 502A that will be able to transport the SYN ACK A packet through the firewall of client 502A. In response to receiving the SYN ACK A packet, client 502A generates an ACK packet destined for client 502B to establish the TCP session between clients 502A and 502B. In one embodiment, client 502A transmits an ACK packet to client 502B (514A). While in one embodiment, network elements 504A and 504B forward the ACK packet to client 502B (514B and 514C), in alternate embodiments, one of network elements 504A-B do not forward the ACK packet as it is not necessary to complete the TCP 3 way handshake between clients 302A-B. At this point in the state diagram, client 502A has established a TCP session to client 502B with the saved TCP parameters that originated from client 502A.

Figure 6:
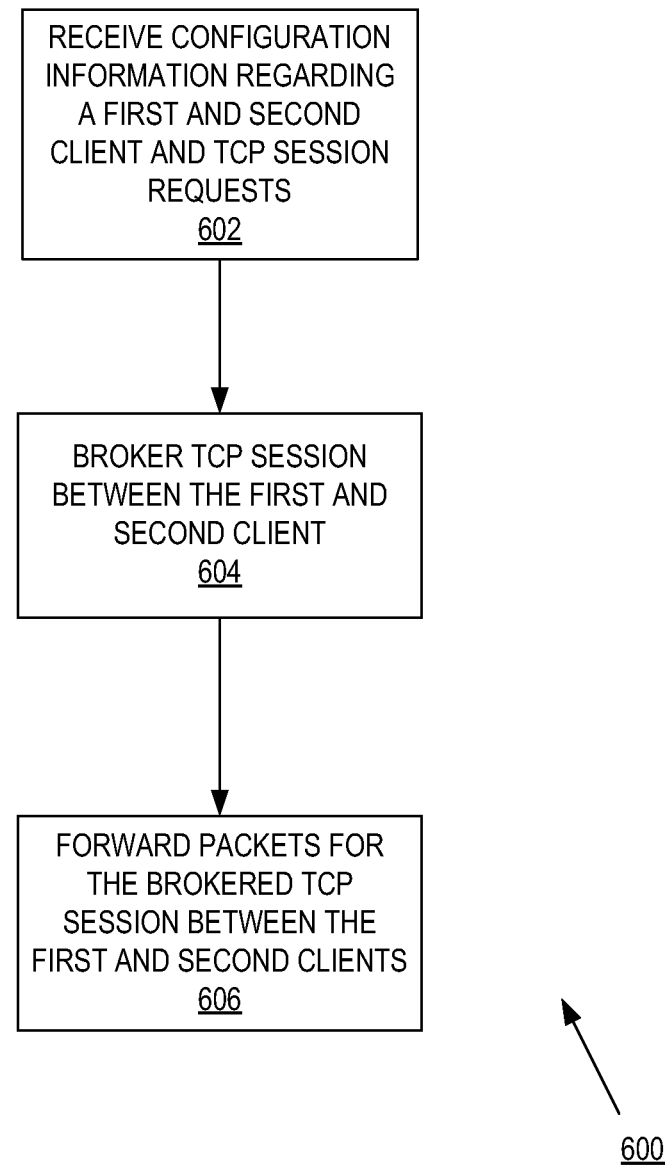
FIG. 6 illustrates an exemplary flow diagram of brokering a TCP session between two clients behind a firewall according to one embodiment of the invention.

FIG. 6 illustrates an exemplary flow diagram of a method 600 that brokers a TCP session between two clients each behind a firewall according to one embodiment of the invention. In one embodiment, method 600 is performed by a network element to broker a TCP session between clients. For example and in one embodiment, network element 504B brokers a TCP session between two clients as described in the FIG. 5, above. In FIG. 6, at block 602, method 600 receives TCP session requests from the first and second clients. In one embodiment, the received packets for SYN packets by inspecting the TCP headers of each received TCP packet. In another embodiment, method 600 associates a received TCP session request with a client by the destination descriptor of the received TCP session request. In this embodiment, a control device configures the network element receiving the TCP session requests to associate a particular destination descriptor with a particular client.

At block 604, method 600 brokers a TCP session between the first and second clients. In one embodiment, method 600 brokers the TCP sessions by generating and transmitting SYN ACK packets for clients that sent SYN packets. Brokering a TCP session is further described in FIG. 7 below. Method 600 forwards packets for the brokered TCP sessions between the first and second clients at block 606. In one embodiment, method 600 forwards the packets by routing or switching the packets as is known in the art.

Figure 7:
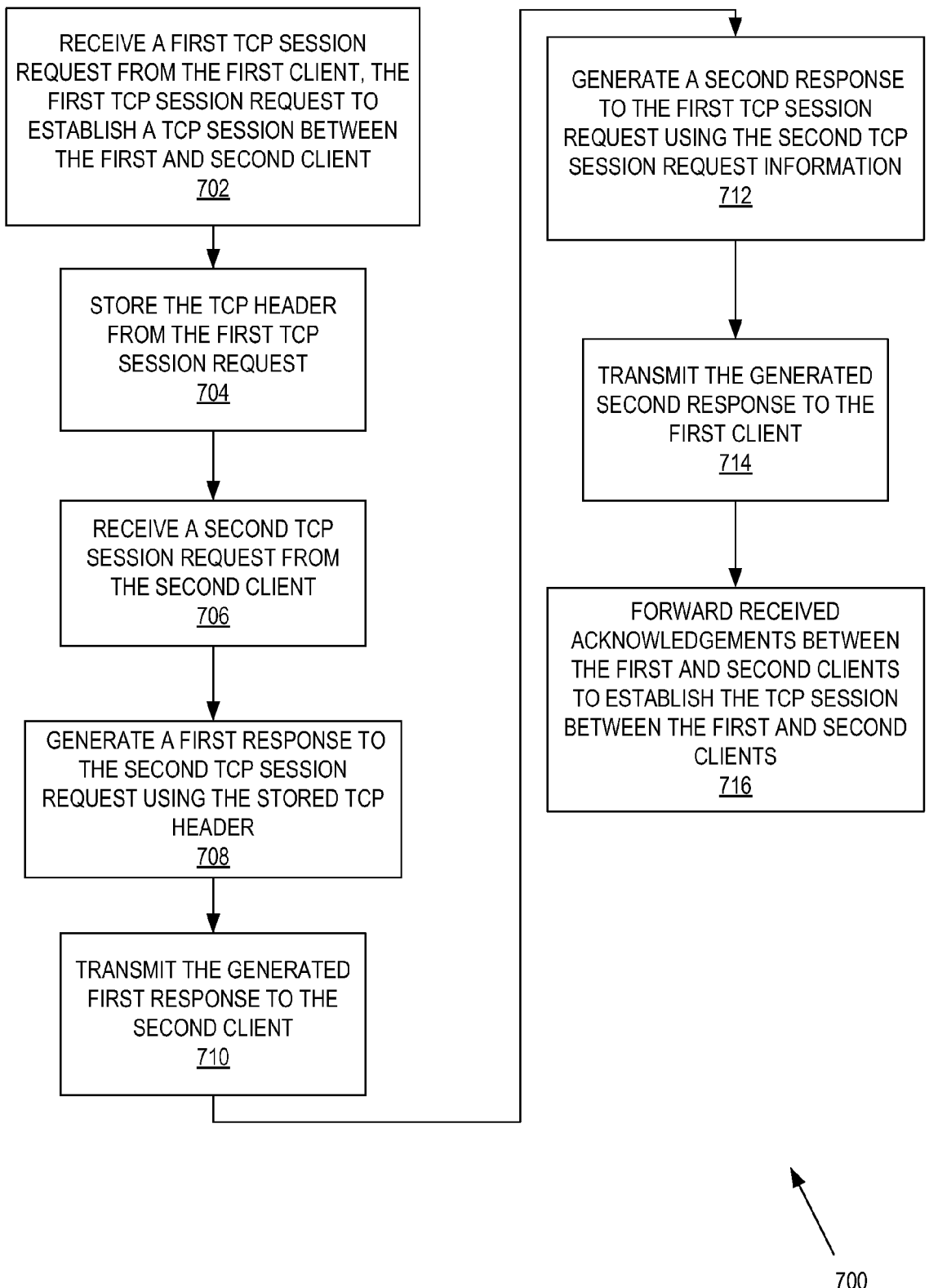
FIG. 7 illustrates an exemplary flow diagram of brokering the 3-way handshake to establish a TCP session between two clients according to one embodiment of the invention.

FIG. 7 illustrates an exemplary flow diagram of brokering the 3-way handshake to establish a TCP session between two clients according to one embodiment of the invention. In FIG. 7, at block 702, method 700 receives a first TCP session request from a first client, where the first TCP session request is a request to establish a TCP session between the first and a second client. As described above, a client is a subscriber end station as described above, such as a computer, laptop, server, etc. In another embodiment, the first and second clients are subscriber end stations that are capable to making a VOIP telephone call over a TCP session. In one embodiment, the TCP session request is a SYN packet as described above with reference to FIGS. 2 and 5.

At block 704, method 700 stores the TCP header from the first TCP session request. While in one embodiment, method 700 stores the entire TCP header, in alternate embodiments, method 700 stores some of the TCP header (e.g., sequence number, window, data offset, options, etc., and/or combination thereof). Method 700 receives a second TCP session request from the second client at block 706.

At block 708, method 700 generates a first response to the second TCP session request using the stored TCP header information. In one embodiment, method 700 generates a SYN ACK packet for the second client as described in FIG. 5 at step 506B as described above. Method 700 transmits the generated first response to the second client at block 710.

At block 712, method 700 generates a second TCP response to the first TCP session request using information from the second TCP session request. In one embodiment, method 700 generates a SYN ACK packet for the first client as described above at step 508B in FIG. 5 above. Method 700 transmits the generated second response to the first client at block 714.

At block 716, method 700 forwards acknowledgments between the first and second clients to establish the TCP session between these clients. In one embodiment, method 700 forwards the ACK packets transmitted by the first and second clients as described above in FIG. 5 at steps 512B-C and 514B-C. Alternatively, method 700 may not forward the acknowledgements.

Figure 8A:
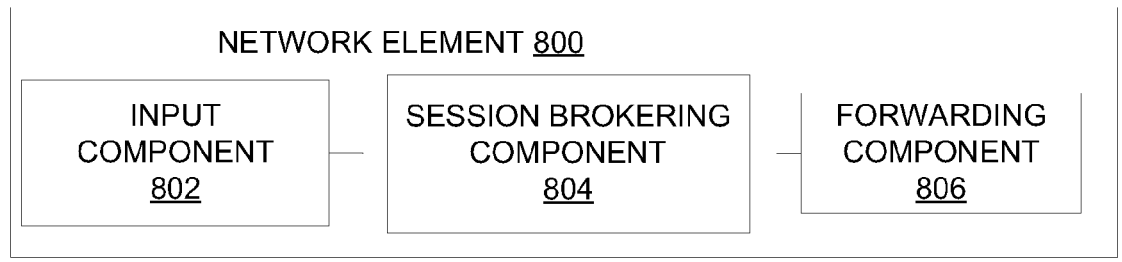
FIG. 8A is a block diagram illustrating an exemplary network element that can broker a TCP session between two clients as used in FIG. 4 according to one embodiment of the invention.

FIG. 8A is a block diagram illustrating an exemplary network element 800 that can broker a TCP session between two clients as used in FIG. 4 according to one embodiment of the invention. In FIG. 8A, network element 800 comprises input component 802, session brokering component 804, and forwarding component 806. Input component 802 receives TCP session requests as described in FIG. 6, block 602. Session brokering component 804 brokers the TCP session as described in FIG. 6, block 604. Forwarding component 806 packets for the broker TCP session as described in FIG. 6, block 606.

Figure 8B:
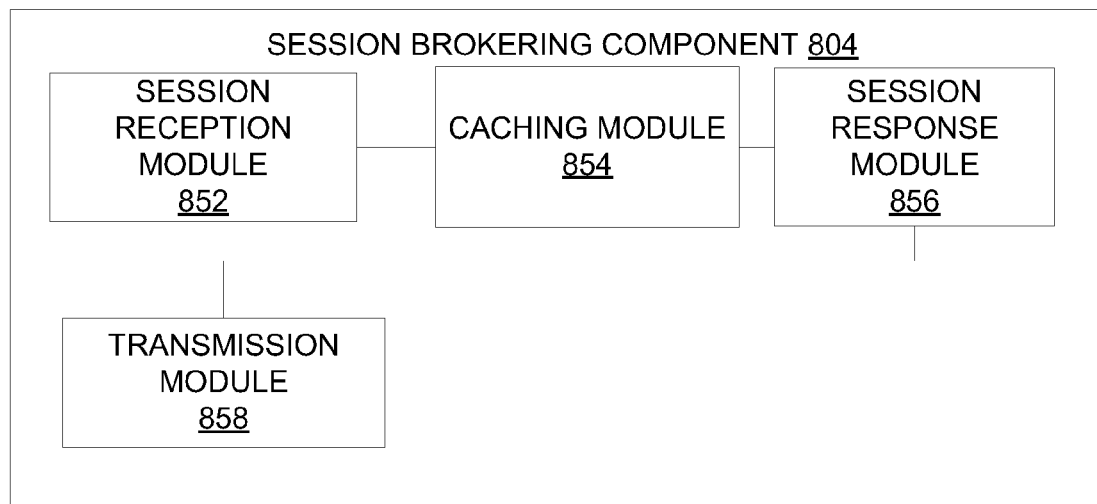
FIG. 8B is a block diagram illustrating an exemplary session brokering component as used in FIG. 8A according to one embodiment of the invention.

FIG. 8B is a block diagram illustrating an exemplary session brokering component 804 as used in FIG. 8A according to one embodiment of the invention. In FIG. 8B, session brokering component 804 comprises session reception module 852, caching module 854, session response module 856, and transmission module 858. Session reception module 852 receives the TCP session requests as described above in FIG. 7, blocks 702 and 706. Caching module 854 stores the TCP header information as described above in FIG. 7, block 704. Session response module 856 generates the TCP responses as described above in FIG. 7, blocks 708 and 712. Transmission module 858 as described above in FIG. 7, blocks 710 and 714.

Figure 9:
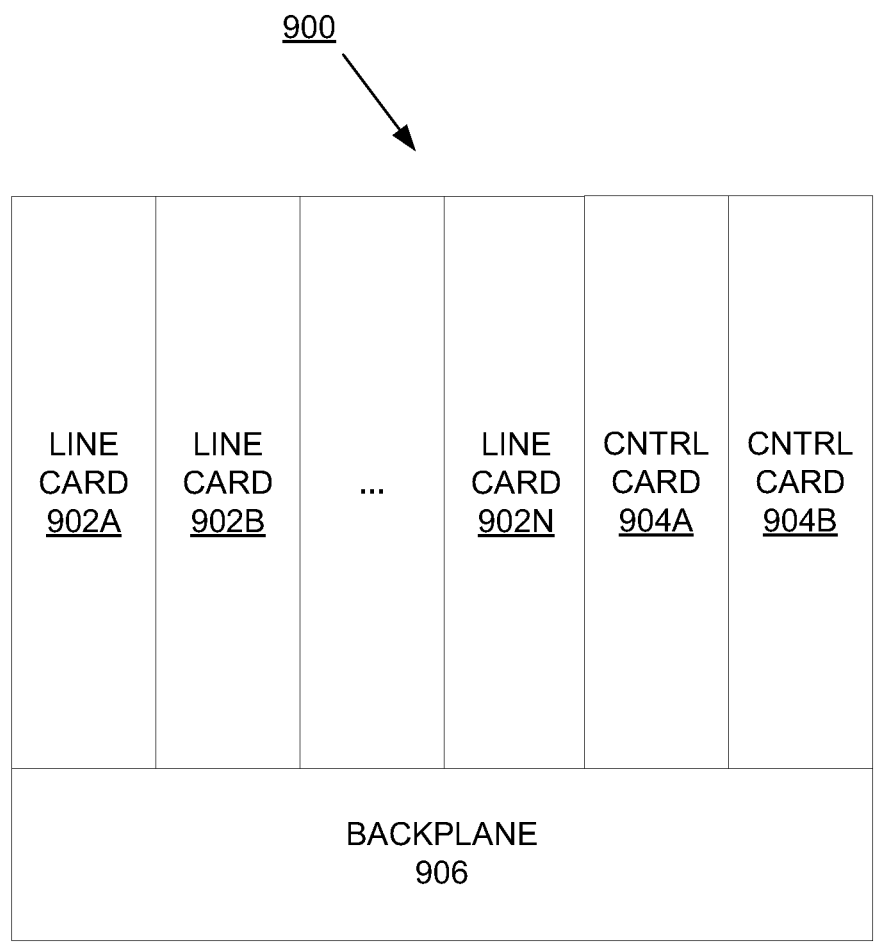
FIG. 9 is a block diagram illustrating an exemplary network element comprising line cards and control card(s) that can broker a TCP session between two clients used in FIG. 4 according to one embodiment of the system.

FIG. 9 is a block diagram illustrating an exemplary network element that can broker a TCP session between two clients used in FIG. 4 according to one embodiment of the system. In FIG. 9, backplane 906 couples to line cards 902A-N and controller cards 904A-B. While in one embodiment, controller cards 904A-B control the processing of the traffic by line cards 902A-N, in alternate embodiments, controller cards 904A-B perform the same and/or different functions (brokering a TCP session, etc.). Line cards 902A-N process and forward traffic according to the policies received from controller cards 904A-B. In one embodiment, line cards 902A-N route and/or acknowledgement and other packets as described in FIGS. 2-12. In another embodiment, line cards 902A-N receive TCP session requests and forwards packets as described in FIG. 8A at blocks 802 and 806. It should be understood that the architecture of the network element 900 illustrated in FIG. 9 is exemplary, and different combinations of cards may be used in other embodiments of the invention.

Alternative Embodiments

The embodiments illustrated for brokering a TCP session have been shown with respect to a network element such as a router with a border gateway function or a media gateway that exists in the network infrastructure. However, embodiments of the invention are not limited to brokering a TCP session with a router with a border gateway function or a media gateway. Alternative embodiment may have the TCP brokering component performed in a separate network element or device. Such an embodiment could be implemented by having the TCP snooping and TCP brokering performed (e.g., the session snooping component and session brokering component of FIG. 8A) by one network element and the other network element forwarding packets.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network element for facilitating a transmission control protocol (TCP) session between a first and second clients even if the first and second clients are each coupled behind a firewall that blocks incoming TCP session requests, the method comprising the steps of:

facilitating, by the network element, the TCP session between the first and second clients without maintaining a full TCP stack for the TCP session in the network element, wherein not maintaining the full TCP stack comprises maintaining a single TCP session between the first and second clients in the network element for a communication between the first and second clients, and wherein the facilitating includes:
brokering the TCP session between the first and second clients, wherein said brokering includes:
receiving a first TCP session request for establishing the TCP session and having a first destination descriptor of the network element from the first client, wherein the first destination descriptor includes a first address and a first port of the network element assigned to the first client by a control device to establish the TCP session;
storing information contained in the first TCP session request;
port latching a first source port of the first client;
receiving a second TCP session request for establishing the TCP session and having a second destination descriptor of the network element from the second client, wherein the second destination descriptor includes a second address and a second port of the network element assigned to the second client by the control device to establish the TCP session;
storing information contained in the second TCP session request;
port latching a second source port of the second client;
in response to the receiving the second TCP session request, generating, by the network element, a first session response to the second TCP session request using the stored information; and
transmitting the first session response to the second client, wherein the first session response is used by the second client to generate an acknowledgment to the first session response to establish the TCP session between the first and second clients; and
forwarding the subsequent TCP data packets from the second client to the first client as part of the established TCP session, wherein said forwarding includes:
translating the second address and the second port of the second destination descriptor within the subsequent TCP data packets respectively into an appropriate address using the stored information contained in the first TCP session request and into the first source port latched by the network element; and
transmitting the translated subsequent TCP data packets to the first client in the TCP session established between the first client and the second client.

2. The method of claim 1, wherein the step of brokering further comprises the steps of:
generating a second session response to the first TCP session request using information from the second TCP session request; and
transmitting the second session response to the first client.

3. The method of claim 1, wherein the stored information contained in the first TCP session request is a TCP header of the first TCP session request.

4. The method of claim 1, wherein the step of storing information contained in the first TCP session request further includes the step of:
recording flags, a sequence number, and a window parameter of the first session request's TCP header.

5. The method of claim 1, wherein the first and second TCP session requests are SYN packets, the first session response is a SYN ACK packet, and the acknowledgment is an ACK packet.

6. The method of claim 1, wherein the network element is a router with a border gateway function.

7. The method of claim 1, wherein the network element is a media gateway.

8. A network comprising:
a plurality of firewall devices;
a plurality of clients, wherein each of the plurality of clients transmits transmission control protocol (TCP) session requests to another one of the plurality of clients to establish a TCP session with that client and each of the plurality of clients is coupled behind one of the plurality of firewall devices, wherein each of the plurality of firewall devices blocks incoming TCP session requests to a client coupled behind the firewall device;
a network element, coupled to the set of one or more firewall devices, wherein the network element facilitates respective TCP sessions between client pairs of the plurality of clients without maintaining respective full TCP stacks for the TCP sessions for the TCP sessions, wherein not maintaining the respective full TCP stacks comprises, for each client pair, maintaining a single TCP session between a first and second clients in the network element for a communication between the client pair, the network element comprising:
a session brokering component to broker a TCP session between different pairs of clients from the plurality of clients, the brokering allows each client pair to establish the TCP session between that client pair, wherein the session brokering component, for each client pair,
receives a first TCP session request for establishing the TCP session of that client pair and having a first destination descriptor of the network element from the first client of that client pair and a second TCP session request for establishing the TCP session of that client pair and having a second destination descriptor of the network element from the second client of that client pair, wherein the first destination descriptor includes a first address and a first port of the network element assigned to the first client by a control device to establish the TCP session, and the second destination descriptor includes a second address and a second port of the network element assigned to the second client by the control device to establish the TCP session,
stores information contained in the first and second TCP session requests,
port latches a first source port of the first client and a second source port of the second client,
in response to the received second TCP session request, generates a first session response to the second TCP session request using the stored information, and
transmits the first session response to the second client, wherein the first session response is used by the second client to generate a first acknowledgment to the first session response to establish the TCP session between the first and second clients; and
a forwarding component coupled to the session brokering component, wherein the forwarding component, for each client pair, forwards subsequent TCP data packets between the first and second clients of that client pair in the TCP session established between the first client and the second clients of that client pair after translating the destination descriptors within the subsequent TCP data packets into appropriate addresses using the stored information contained in the first and second TCP session requests, and into the source ports latched by the session brokering component.

9. The network of claim 8, wherein the session brokering component, for each pair of clients, also:
   generates a second session response to the first TCP session request using information from the second TCP session request; and
   transmits the second session response to the first client.

10. The network of claim 9, wherein the forwarding component also:
    forwards the first acknowledgement to the first session response from the second client to the first client and a second acknowledgement to the second session response from the first client to the second client.

11. The network of claim 8, wherein the information stored includes a TCP header of the first TCP session request.

12. The network of claim 8, wherein the information stored includes:
    flags, a sequence number, and a window parameter of the first TCP session request's TCP header.

13. The network of claim 8, wherein the network element is a router with a border gateway function.

14. The network of claim 8, wherein the network element is a media gateway.

15. A network element adapted to facilitate transmission control protocol (TCP) sessions between different pairs of clients from a plurality of clients, wherein the clients in each client pair are coupled behind different firewalls that block incoming TCP session requests to those clients, the network element comprising:
    a session brokering component to establish respective TCP sessions between client pairs of the plurality of clients without maintaining respective full TCP stacks for the TCP sessions, wherein not maintaining the respective full TCP stacks comprises, for each client pair, maintaining a single TCP session between a first and second clients in the network element for a communication between the client pair, wherein the session brokering component, for each of the client pairs, is to:
       receive a first TCP session request for establishing the TCP session of the client pair and having a first destination descriptor of the network element from a first client of that client pair and a second TCP session request for establishing the TCP session of the client pair and having a second destination descriptor of the network element from the second client of that client pair, wherein the first destination descriptor includes a first address and a first port of the network element assigned to the first client by a control device to establish the TCP session between the client pair, and the second destination descriptor includes a second address and a second port of the network element assigned to the second client by the control device to establish the TCP session between the client pair;
       store information contained in the first and second TCP session requests;
       port latch source ports of the first and second clients of the client pair;
       generate, in response to the received second TCP session request, a first session response to the first TCP session request using the stored information; and
       transmit the first session response to the second client, wherein the first session response is used by the second client to generate an acknowledgment to the first session response to establish the TCP session between the first and second clients of the client pair; and
    a forwarding component coupled to the session brokering component, the forwarding component, for each of the client pairs, is to forward subsequent TCP data packets between the first and second clients of the client pair as part of the TCP session between the client pair, and to translate destination descriptors within the subsequent TCP data packets into appropriate addresses using the store information contained in the first and second TCP session requests, and into the source ports latched by the session brokering component instead of maintaining a full TCP stack in the network element for the TCP session between the client pair.

16. The network element of claim 15, wherein the session brokering component is further, for each of the client pairs, to:
    generate a second session response to the first TCP session request using information from the second TCP session request; and
    transmit the second session response to the first client.

17. The network element of claim 15, wherein the forwarding component is further, for each of the client pairs, to:
    forward the first acknowledgement to the first session response from the second client to the first client and a second acknowledgement to the second session response from the first client to the second client.

18. The network element of claim 15, wherein the information stored includes a TCP header of the first TCP session request.

19. The network element of claim 15, wherein the network element further includes:
    a session snooping component coupled to the session brokering component to snoop traffic received for the first and second TCP session requests.

20. The network of claim 15, wherein the network element is a router with a border gateway function.

21. The network of claim 15, wherein the network element is a media gateway.

* * * * *

UNITED STATES PATENT AND TRADEMARK OFFICE
CERTIFICATE OF CORRECTION

| | | |
|---|---|---|
| PATENT NO. | : 9,059,968 B2 | Page 1 of 1 |
| APPLICATION NO. | : 12/614372 | |
| DATED | : June 16, 2015 | |
| INVENTOR(S) | : Panattu Sethumadhavan et al. | |

It is certified that error appears in the above-identified patent and that said Letters Patent is hereby corrected as shown below:

In the Claims

In Column 16, Line 48, in Claim 20, delete "The network" and insert -- The network element --, therefor.

In Column 16, Line 50, in Claim 21, delete "The network" and insert -- The network element --, therefor.

Signed and Sealed this
Seventeenth Day of November, 2015

Michelle K. Lee
*Director of the United States Patent and Trademark Office*